US010002461B2

(12) United States Patent
De Goes

(10) Patent No.: US 10,002,461 B2
(45) Date of Patent: Jun. 19, 2018

(54) SUBDIVISION EXTERIOR CALCULUS FOR GEOMETRY PROCESSING

(71) Applicant: Pixar, Emeryville, CA (US)

(72) Inventor: Fernando Ferrari De Goes, Berkeley, CA (US)

(73) Assignee: Pixar, Emeryville, CA (US)

(*) Notice: Subject to any disclaimer, the term of this patent is extended or adjusted under 35 U.S.C. 154(b) by 0 days. days.

(21) Appl. No.: 15/409,005

(22) Filed: Jan. 18, 2017

(65) Prior Publication Data

US 2017/0206705 A1    Jul. 20, 2017

Related U.S. Application Data

(60) Provisional application No. 62/280,032, filed on Jan. 18, 2016.

(51) Int. Cl.
*G06T 17/20* (2006.01)

(52) U.S. Cl.
CPC ................ *G06T 17/205* (2013.01)

(58) Field of Classification Search
None
See application file for complete search history.

(56) References Cited

U.S. PATENT DOCUMENTS

| | | | | |
|---|---|---|---|---|
| 2004/0090438 A1* | 5/2004 | Alliez | ..................... | G06T 17/20 345/423 |
| 2004/0170302 A1* | 9/2004 | Museth | ................... | G06T 17/00 382/107 |
| 2005/0093862 A1* | 5/2005 | Boier-Martin | .......... | G06T 17/20 345/420 |

OTHER PUBLICATIONS

Alexa, M., and Wardetzky, M. 2011. Discrete Laplacians on general polygonal meshes. ACM Trans. Graph. 30, 4.
Arnold, D. N., Falk, R. S., and Winther, R. 2006. Finite element exterior calculus, homological techniques, and applications. Acta Numerica 15, 1-155.
Auchmann, B., and Kurz, S. 2006. A geometrically defined discrete Hodge operator on simplicial cells. IEEE Trans. On Magnetics 42, 4, 643-646.
Bossavit, A. 2000. Computational electromagnetism and geometry. (5): The 'Galerkin Hodge'. J. Japan Soc. Appl. Electromagn & Mech. 8, 2, 203-9.
Buffa, A., Rivas, J., S 823 Angalli, G., and Vázquez, R. 2011. Isogeometric discrete differential forms in three dimensions. SIAM J. on Numerical Analysis 49, 2, 818-844.
Buffa, A., Sangalli, G., and Vázquez, R. 2014. Isogeometric methods for computational electromagnetics: B-spline and T-spline discretizations. J. Comput. Phys. 257, 1291-1320.

(Continued)

*Primary Examiner* — Michelle Chin
(74) *Attorney, Agent, or Firm* — Patterson + Sheridan, LLP

(57) ABSTRACT

Techniques are disclosed for solving geometry processing tasks on a subdivision surface of an input geometry using a subdivision exterior calculus (SEC) framework. A control polygonal mesh is received for generating a subdivision surface model. The polygonal mesh is associated with subdivision levels. To generate the subdivision surface model, one or more subdivision matrices of the polygonal mesh is determined at each subdivision level. One or more SEC matrices is computed from the subdivision matrices. The differential equation required by the geometry processing application is then solved numerically on the input control mesh using the SEC matrices.

17 Claims, 5 Drawing Sheets

(56) References Cited

OTHER PUBLICATIONS

Cirak, F., Scott, M. J., Antonsson, E. K., Ortiz, M., and Schröder, P. 2002. Integrated modeling, finite-element analysis, and engineering design for thin-shell structures using subdivision. Comput. Aided Des. 34.
Cottrell, J. A., Hughes, T. J. R., and Bazilevs, Y. 2009. Isogeometric Analysis: Toward Integration of CAD and FEA. Wiley Publishing.
Dahmen, W. 1986. Subdivision algorithms converge quadratically. J. Comput. Appl. Math. 16, 2, 145-158.
De Goes, F., Memari, P., Mullen, P., and Desbrun, M. 2014. Weighted triangulations for geometry processing. ACM Trans. Graph. 33, 3.
Desbrun, M., Meyer, M., Schröder, P., and Barr, A. H. 1999. Implicit fairing of irregular meshes using diffusion and curvature flow. ACM SIGGRAPH.
Desbrun, M., Kanso, E., and Tong, Y. 2008. Discrete differential forms for computational modeling. In Discrete Differential Geometry, A. I. Bobenko et al. (Eds), vol. 38 of Oberwolfach Seminars. 287-324.
Elcott, S., Tong, Y., Kanso, E., Schröder, P., and Desbrun, M. 2007. Stable, circulation-preserving, simplicial fluids. ACM Trans. Graph. 26, 1.
Fisher, M., Schröder, P., Desbrun, M., and Hoppe, H. 2007. Design of tangent vector fields. ACM Trans. Graph. 26, 3.
Frankel, T. 2004. The Geometry of Physics: An Introduction. Cambridge U. Press.
Grinspun, E., Krysl, P., and Schröder, P. 2002. CHARMS: A simple framework for adaptive simulation. ACM Trans. Graph. 21, 3.
He, L., Schaefer, S., and Hormann, K. 2010. Parameterizing subdivision surfaces. ACM Trans. Graph. 29, 4.
Hirani, A. 2003. Discrete Exterior Calculus. PhD thesis, Caltech.
Hughes, T., Cottrell, J., and Bazilevs, Y. 2005. Isogeometric analysis: CAD, finite elements, NURBS, exact geometry and mesh refinement. Comput. Methods Appl. Mech. Eng. 194, 39-41, 4135-4195.

Jüttler, B., Mantzaflaris, A., Perl, R., and Rumpf, M., 2015. On isogeometric subdivision methods for PDEs on surfaces. arXiv:1503.03730.
Liu, S., Jacobson, A., and Gingold, Y. 2014. Skinning cubic Be'zier splines and Catmull-Clark subdivision surfaces. ACM Trans. Graph. 33, 6.
Liu, B., Mason, G., Hodgson, J., Tong, Y., and Desbrun, M. 2015. Model-reduced variational fluid simulation. ACM Trans. Graph. 34, 6.
Lounsbery, M., Derose, T. D., and Warren, J. 1997. Multiresolution analysis for surfaces of arbitrary topological type. Acm Trans. Graph. 16, 1, 34-73.
McCormick, S. F. 1984. MultigridMethods for Variational Problems: Further Results. SIAM J. Numer. Anal. 21, 2, 255-263.
Mullen, P., Tong, Y., Alliez, P., and Desbrun, M. 2008. Spectral conformal parameterization. Comput. Graph. Forum 27, 5.
Mullen, P., Memari, P., De Goes, F., and Desbrun, M. 2011. Hot: Hodge-optimized triangulations. ACMTrans. Graph. 30, 4.
Nguyen T. Kar?iauskas, K., and Peters, J. 2014. A comparative study of several classical, discrete differential and isogeometric methods for solving Poissons equation on the disk. Axioms, 3, 280-299.
Nießner, M., Loop, C., Meyer, M., and Derose, T. 2012. Feature-adaptive GPU rendering of Catmull-Clark subdivision surfaces. ACM Trans. Graph. 31, 1.
Stam, J. 1998. Exact evaluation of Catmull-Clark subdivision surfaces at arbitrary parameter values. ACM SIGGRAPH, 395-404.
Stam, J. 2003. Flows on surfaces of arbitrary topology. ACM Trans. Graph. 22, 3.
Thomaszewski, B., Wacker, M., and Strasser, W. 2006. A consistent bending model for cloth simulation with corotational subdivision finite elements. In Symp. Comp. Anim.
Wang, K., Weiwei, Tong, Y., Desbrun, M., and Schröder, P. 2006. Edge subdivision schemes and the construction of smooth vector fields. ACM Trans. Graph. 25, 3.
Wang, K. 2008. A subdivision approach to the construction of smooth differential forms. PhD thesis, Caltech.
Wardetzky, M., Mathur, S., Kälberer, F., and Grinspun, E. 2007. Discrete Laplace operators: No free lunch.In Symp. Geom. Process., 33-37.

* cited by examiner

SUBDIVISION EXTERIOR CALCULUS FOR GEOMETRY PROCESSING

CROSS-REFERENCE TO RELATED APPLICATIONS

This application claims benefit of U.S. Provisional Patent Application Ser. No. 62/280,032, filed Jan. 18, 2016, which is incorporated herein by reference in its entirety.

BACKGROUND

Field

Embodiments of the present disclosure generally relate to computer graphics, and more specifically, to process geometry tasks on subdivision using a subdivision exterior calculus framework.

Description of the Related Art

In three-dimensional computer graphics, subdivision surface modeling is a technique used to represent a complex smooth surface via a specification of a coarser piecewise linear polygon mesh. A coarse control mesh of linear polygons is recursively refined by subdividing the mesh to create new vertices and faces, where the positions of the new vertices are determined based on positions of nearby old vertices. The resulting mesh is then finer and smoother than the original control mesh. Subdivision surface modeling is a commonly used technique in the entertainment industry and has various applications in geometry representation, e.g., in modeling, animation, and rendering smooth surfaces of arbitrary topology.

However, current approaches to geometry processing on subdivision surfaces approximate differential equations restricted to the surfaces of the control mesh, thus limiting the accuracy of the solutions. One approach used to solve differential equations is through discrete exterior calculus (DEC). Generally, DEC provides an extension to exterior calculus to discrete spaces, such as non-uniform polygonal meshes. DEC can be used to solve scalar and vector-valued differential equations on a polygonal mesh without excessive computational cost. However, performing DEC techniques to a control mesh disregards the geometry of a limit surface, which results in considerable loss of accuracy.

Another approach to solving differential equations on subdivision surfaces is performing DEC on a denser mesh generated by subdividing the control mesh a finite amount of times. Doing so produces a more accurate result because the dense mesh better captures the limit geometry. However, this approach may significantly increase the number of degrees of freedom and computational cost. In addition, this approach weakens the convergence rate of the numerical solutions, since the denser mesh uses linear bases instead of the high-order bases of the subdivision surface. Therefore, although this approach provides results with greater accuracy, it does so at the cost of computational efficiency.

SUMMARY

One embodiment presented herein discloses a method for processing a subdivision surface of an input geometry. This method generally includes receiving, via a processor, a control polygonal mesh associated with one or more subdivision levels. A subdivision surface model is generated from the control polygonal mesh based on one or more differential equations by: (i) determining, at each subdivision level of the control polygonal mesh, one or more subdivision matrices of the control polygonal mesh; (ii) computing, from the subdivision matrices, one or more matrices approximating differential operators; (iii) solving the one or more differential equations with the approximated differential operators; and (iv) subdividing the control polygonal mesh using a solution of the solved one or more differential equations.

Other embodiments include, without limitation, a computer-readable storage medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
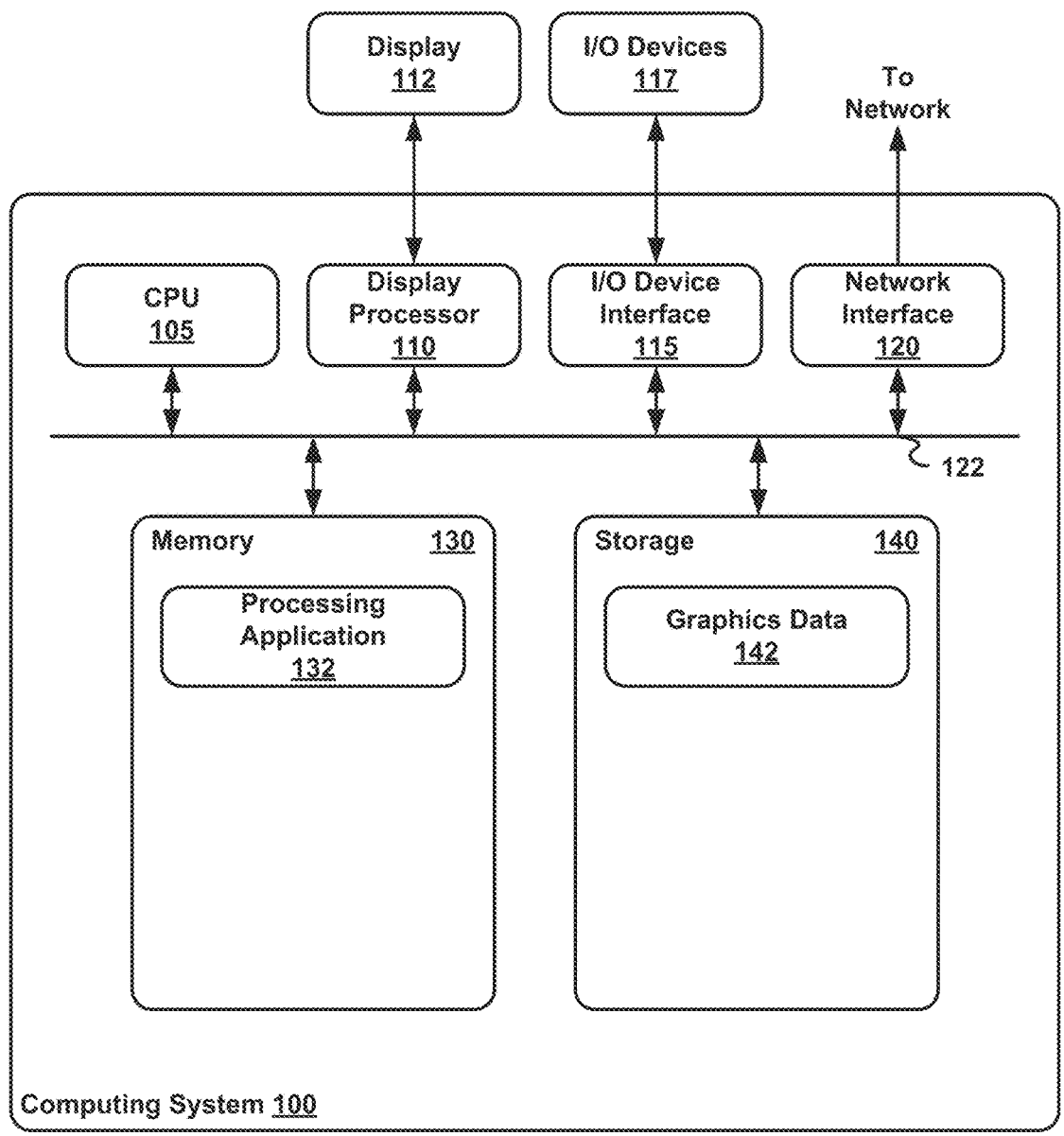
FIG. 1 illustrates an example computing system configured to process geometric tasks on subdivision surfaces, according to one embodiment.

Subdivision surfaces describe smooth surfaces by recursively refining the control mesh. In geometry processing, existing approaches to solving differential equations on subdivision surfaces generally rely on the geometry of a given control mesh, thus loosely approximating the limit surface. This discrepancy between the shape of the control mesh and the limit surface can result in distortion to the computation of numerical solutions to differential equations on subdivision surface. And although finer levels of subdivision improve overall accuracy of the resulting mesh by generating denser meshes that better approximate the limit surface, doing so results in a trade-off in computational cost.

Embodiments presented herein disclose techniques for processing an input geometry. In one embodiment, a graphics processing application executes on a computing system. The graphics processing application may receive input geometry to be processed and presented as part of the three-dimensional (3D) scene. The input geometry may correspond to a polygonal mesh comprising a number of vertices, edges, and faces. As part of the graphics processing, the application may smooth the mesh using subdivision surface modeling.

To do so, in one embodiment, the graphics processing application provides a discretization of exterior calculus applied to subdivision surfaces on the control mesh. More particularly, embodiments provide subdivision exterior calculus that includes differential operators that are applied directly to a control mesh—without storing additional mesh data at various stages of subdivision surface determination. As will be further described below, the graphics processing application defines discrete forms on the control mesh based on a limit surface determined by the control mesh. This allows the graphics processing application apply a subdivision exterior calculus on the control mesh while providing numerical solutions of the limit subdivision surface.

For example, the graphics processing application may approximate Hodge star operators from DEC techniques in recursively refining the control mesh. This allows desirable properties of Hodge star operators in to be inherited, such as symmetry, convergence, and scale-awareness. The graphics processing application may, using discrete exterior derivatives and Hodge star operators to consistently discretize differential operators as needed in smoothing the input geometry. The graphics processing application may provide the SEC framework in numerous scenarios where subdivision surfaces are determined, such as in parameterization, geodesic distance computation, and vector field design.

Advantageously, embodiments presented herein provide a framework that allows geometric processing operations formulated under DEC to be carried out directly onto subdivision schemes. That is, the framework evaluates a control mesh at a specified amount of subdivision levels to derive operators that correspond to a DEC operator but can be applied directly to the control mesh under a given geometric processing operation (e.g., parameterization). The resulting subdivision surface model on the control mesh retains a high-order accuracy that preserves structural properties of the original mesh. Further, because the computations are directly performed on the control mesh, storage of intermediary data is minimized, therefore saving on computational cost.

FIG. 1 illustrates an example computing system 100 configured to process geometric tasks on subdivision surfaces, according to one embodiment. As shown, the computing system 100 includes, without limitation, a central processing unit (CPU) 105, a display processor 110, an I/O device interface 115, a network interface 120, a memory 130, and a storage 140, each connected to an interconnect bus 122. The display processor 110 may connect a display 112 to the computing system 100. Further, the I/O device interface 115 may connect I/O devices 117 (e.g., keyboard and mouse devices) to the computing system 100. Computing elements shown within the computing system 100 may correspond to a physical computing system or may be a virtual computing instance executing within a computing cloud.

The CPU 105 retrieves and executes programming instructions stored in the memory 130 as well as stores and retrieves application data residing in the storage 140. The interconnect bus 122 is used to transmit programming instructions and application data between the CPU 105, display processor 110, I/O device interface 115, network interface 120, memory 130, and storage 140. CPU 105 is representative of a single CPU, multiple CPUs, a single CPU having multiple processing cores, and the like. And the memory 130 is representative of a random access memory. The storage 140 may be a disk drive or solid state storage device. Although shown as a single unit, the storage 140 may be a combination of fixed and/or removable storage devices, such as fixed disc drives, removable memory cards, or optical storage, network attached storage (NAS), or a storage area-network (SAN).

The display processor 110 is coupled to the interconnect bus 122. However, other communication paths (e.g., a PCI Express, Accelerated Graphics Port, or HyperTransport link) may be used. In one embodiment, the display processor 110 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory.

Further, the display processor 110 periodically delivers pixels to a display device 110 (e.g., a computer monitor or television). Additionally, the display processor 110 may output pixels to film recorders adapted to reproduce computer-generated images on photographic film. The display processor 110 can provide the display device 112 with an analog or digital signal.

In one embodiment, the display processor 110 includes circuitry optimized for graphics and video processing, such as a GPU. In another embodiment, the display processor 110 incorporates GPU circuitry. In yet another embodiment, the display processor 110 is omitted, and software executed by the CPU 105 performs the functions of the display processor 110.

In one embodiment, the memory 130 includes a processing application 132 that communicates with the display processor 110 to render input graphics data (e.g., graphics data 142 in storage 130) for display on the display 112. For example, the processing application 132 includes 3D rendering capabilities for generating pixel data for output images from instructions and data defining the geometry, lighting shading, texturing, motion, and/or camera parameters for a 3D scene.

In addition, the processing application 132 provides a subdivision exterior calculus (SEC) framework that improves upon discrete exterior calculus methods as applied to subdivision surfaces. More particularly, the SEC framework provides operators that can be used to perform computations on a control mesh that loosely approximates a limit surface. Using SEC operators results in a relatively higher order of accuracy while also preserving structure of the control mesh.

Generally, subdivision surface modeling generates smooth surfaces by recursively refining a polygonal control mesh $\mathcal{M}$ of the graphics data 142, which itself includes a number of vertices, faces, and edges. The control mesh $\mathcal{M}$ is subdivided in a number of subdivision levels l. For instance, from a mesh $\mathcal{M}^l$ at subdivision level l, the processing application 132 produces a refined mesh $\mathcal{M}^{l+1}$ by inserting new vertices, edges, and faces to $\mathcal{M}^l$ and updates vertex positions $X^{l+1}$ to a weighted average of $X^l$. The processing application 132 determines the weights by a local connectivity of the input mesh. A sparse matrix can concisely encode the weights.

The subdivision matrix at level l can be represented by $S_0^l$, where the subscript indicates that values at vertices are carried from level l to l+1. The accumulation of subdivision matrices from a course mesh $\mathcal{M}^0$ to a fine mesh $\mathcal{M}^l$ can be represented as:

$$A_0^l \stackrel{\text{def}}{=} S_0^{l-1} \ldots S_0^1 S_0^0 \tag{1}$$

As the number of refinement steps increases, the columns of $A_0^l$ converge to values of smooth basis functions $\Phi_0^0 = \{\Phi_v^0\}$, one for each vertex v in $\mathcal{M}^0$. The basis functions provide a parametric representation for subdivision surfaces, which are then used to evaluate the limit surface at arbitrary locations. The limit surface is represented as manifold $\mathcal{S} = \Phi_0^0 X^0$.

Further, the processing application 132, in determining subdivision surfaces of a given input control mesh, solves differential equations on the surfaces of the mesh with a relative accuracy. In one embodiment, for an input control mesh, the processing application 132 determines an exterior derivative for each of the differential k-forms of the mesh surface. A differential k-form ω defined on a manifold $\mathcal{S}$ is a smooth antisymmetric multilinear function of a point $x \in \mathcal{S}$ that maps k tangent vectors to a scalar, i.e., $\omega: T_x\mathcal{S} \times \ldots \times T_x\mathcal{S} \to \mathbb{R}$, where $T_x\mathcal{S}$ is the tangent space at x. Further, differential forms define vector spaces, where a vector space of a k-form is denoted as $\Omega_k$. An exterior derivative defines a linear operator mapping k-forms to (k+1)-forms via differentiation. An exterior derivative unifies differential operators in scalar and vector (e.g., gradient and curl).

Figure 2:
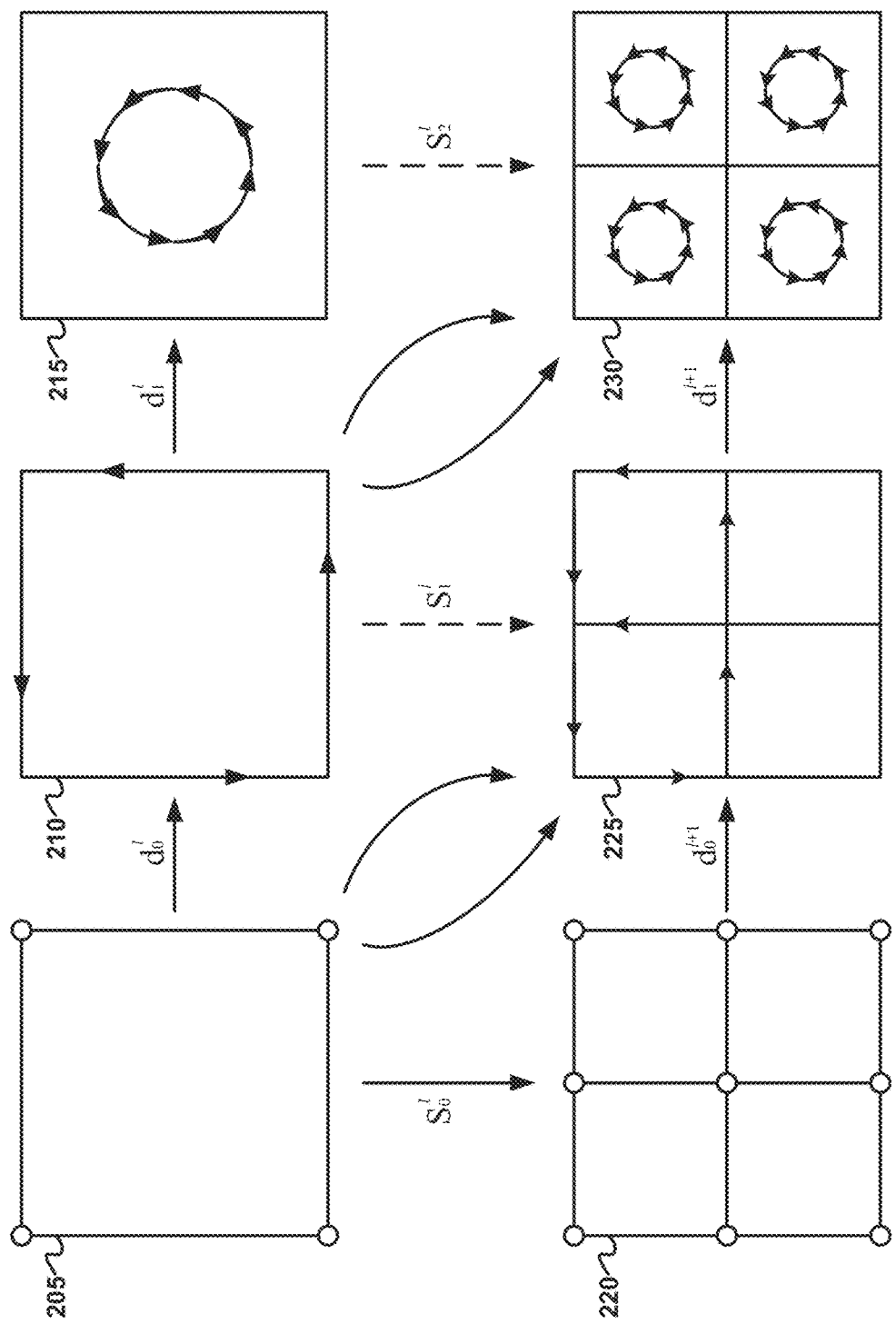
FIG. 2 illustrates a conceptual flow diagram of k-form subdivision, according to one embodiment.

FIG. 2 illustrates a conceptual flow diagram of k-form subdivision, according to one embodiment. A differential k-form is an assignment of one scalar value to each k-cell of the control mesh. In one embodiment, the processing application 132 uses exterior derivatives to map a 0-form to a 1-form, a 1-form to a 2-form, and so on. A 0-form, such as that depicted at 205, is a scalar representing an evaluation of a function at vertices. Further, the function is of a surface as a number per point.

By determining a derivative $d_0^l$ at a subdivision level l, a 1-form 210 can be identified. The exterior derivative for a 0-form is a E×V matrix with rows containing ±1 for endpoints of a given edge with the sign being determined by the edge orientation. A 1-form, such as that depicted at 210, is a scalar representing a tangent vector field (in one dimension) integrated along oriented edges. Determining a 1-form of allows the processing application 132 to store information relating to an amount of circulation that a vector has along a given edge (rather than storing vector coordinates).

The processing application 132 may determine, from an exterior derivative of a 1-form, a 2-form. The exterior derivative for a 1-form $d_1$ is a F×E matrix with ±1 entries according to the orientation of edges around oriented polygonal faces. A 2-form, such as that depicted at 215, is a scalar encoding a density through its area integral over oriented faces. A 2-form represents a function integrated over a polygon.

In addition, the processing application 132 determines an inner product for each differential k-form. Doing so allows the processing application 132 to compare a given differential k-form with another. The inner product is discretized by assigning a matrix $H_k$ (also referred to herein as the discrete Hodge star operator) to each space $\Omega_k$ such that $\langle a_k, b_k \rangle = a_k H_k b_k$. The discrete Hodge star operator uses a metric of the n-dimensional manifold $\mathcal{S}$ to establish an isomorphism mapping a k-form to an (n−k)-form. Further, the discrete Hodge star operator determines a linear mapping from a discrete k-form $w_k$ to a discrete version of the dual (2−k)-form $\star w_k$ via an approximation $\star w_k \approx H_k w_k$. Further still, discrete Hodge star operators are approximations of a continuous inner product.

Consequently, discretizing the Hodge star operators controls numerical accuracy of computations using a discrete exterior calculus (DEC). Using discrete exterior derivatives and Hodge stars, the processing application 132 can assemble discrete differential operators for determining subdivision surfaces. As stated, the processing application 132 provides an SEC framework for solving differential equations on subdivision surfaces with a relatively high order of accuracy. Further, the framework maintains structure-preserving characteristics generally provided by DEC, but with modifications over several properties, such as the inner product.

To extend DEC to an SEC framework, in one embodiment, the processing application 132 defines high order Whitney basis functions for generating a limit surface for an input control mesh. More particularly, the processing application 132 uses subdivision basis functions $\Phi_0^0$ as Whitney 0-form bases and constructs subdivision schemes for discrete 1- and 2-forms by requiring that generated subdivision matrices commute with discrete exterior derivatives. The processing application 132 enforces the following relationship between subdivision matrix $S_k^l$ and discrete exterior derivative $d_k^l$ of k-form at every level l:

$$d_k^{l+1} S_k^l = S_{k+1}^l d_k^l \tag{2}$$

This property ensures that subdividing a discrete k-form followed by the application of a discrete exterior derivative is equivalent to applying the discrete exterior derivative followed by a (k+1)-form subdivision step. Illustratively, FIG. 2 depicts a subdivision matrix of the 0-form at 220, of the 1-form at 225, and of the 2-form at 230. As shown, the subdivision matrices 220, 225, and 230 are commutative with the respective discrete exterior derivatives. By recursively subdividing the discrete forms, the processing application 132 defines the Whitney bases $\Phi_k^0 = \{\phi_{\sigma k}^0\}$ for discrete k-forms that commute with continuous exterior derivatives. Using this construction, k-form basis functions induced by subdivision at any level l are refinable:

$$\Phi_k^l = \Phi_k^{l+1} S_k^l \tag{3}$$

The spaces of discrete k-forms spanned by subdivision are nested $\Omega_k^0 \subset \Omega_k^1 \subset \ldots \subset \Omega_k^\infty$, k=0,1,2. Such an arrangement allows the processing application 132 to define discrete forms on the control mesh. Further, equation (2) allows the processing application 132 to directly use discrete exterior derivatives on the control mesh and still define an exact sequence on corresponding subdivision-based smooth forms.

The inner product in the SEC framework is metric-dependent and therefore contingent on a geometry of the limit surface generated by subdivision. For two discrete k-forms $a_k^0$ and $b_k^0$ defined on the control mesh corresponding to smooth k-forms $\alpha_k = \Phi_k^0 a_k^0$ and $\beta_k = \Phi_k^0 b_k^0$, the inner product is:

$$\langle \alpha_k, \beta_k \rangle = \langle \Phi_k^0 a_k^0, \Phi_k^0 b_k^0 \rangle = \Sigma_{\sigma_k, \eta_k} a_{\sigma_k}^0 b_{\eta_k}^0 \langle \phi_{\sigma_k}^0, \phi_{\eta_k}^0 \rangle \tag{4}$$

Equation 4 results in an array of values stored for vertices, edges, and faces. Consequently, the coefficients $\langle \phi_{\sigma_k}^0, \phi_{\eta_k}^0 \rangle$ induced by the subdivision bases define a Hodge star operator for discrete k-forms through:

$$\star_k^0 \stackrel{\text{def}}{=} \langle \Phi_k^0, \Phi_k^0 \rangle \tag{5}$$

The above represents an inner product matrix that describes an integration of how two bases of the limit of subdivision relate with one another. The discrete Hodge star represents a mass matrix between the subdivision Whitney basis functions. The discrete Hodge star may be approximated based on a refinement relation to the Whitney basis functions. That is, equation 3 implies that $\star_k^0$ can be expressed in terms of the Hodge star $\star_k^1$ on a once subdivided control mesh:

$$\star_k^0 = \langle \Phi_k^0, \Phi_k^0 \rangle = \langle \Phi_k^1 S_k^0, \Phi_k^1 S_k^0 \rangle = (S_k^0)^t \langle \Phi_k^1, \Phi_k^1 \rangle (S_k^0) = (S_k^0)^t \star_k^1 (S_k^0) \quad (6)$$

Applying the refinement recursively/l times results in:

$$\star_k^0 = (A_k^l)^t H_k^l (A_k^l) \quad (7)$$

Equation 7 identifies a relationship between the inner product and the control mesh. The matrix $A_k^l$ represents the combination of subdivision over the levels l. The exact Hodge stars $\star_k^0$ are approximated at level 0 by determining DEC Hodge stars $H_k^l$ at level l. And the discrete Hodge stars can be approximated for the control mesh itself for the SEC framework using the refinement relation at equation 7 to derive $\mathbb{H}_k^0$:

$$\mathbb{H}_k^0 \overset{def}{=} (A_k^l)^t H_k^l (A_k^l) \quad (8)$$

Advantageously, the resulting Hodge star matrices (and any subsequent computations) are performed on the original control mesh, without adding new degrees of freedom to the subdivision process. Further, properties of DEC, such as symmetry, convergence, and scale-awareness are inherited and preserved by construction. The resulting Hodge stars also remain constant accurate on planar control meshes since subdivision reproduces constant fields.

As a result, the processing application 132 may use the SEC framework to perform computations on a control mesh of any subdivision surface. The processing application 132 may precompute SEC-based Hodge stars by evaluating equation 8 on the control mesh. Doing so allows the processing application 132 to derive the following forms for discrete operators for subdivision surfaces operations:

TABLE 1

Discrete Differential Operators for Subdivision Surfaces

| Operator | Polygonal Surface | Subdivision Surface |
|---|---|---|
| Gradient | $d_0$ | $d_1^t$ |
| Curl | $d_1$ | $d_0^t$ |
| Divergence | $d_0^t \mathbb{H}_1$ | $d_1 \mathbb{H}_1^{-1}$ |
| Laplace-Beltrami | $d_0^t \mathbb{H}_1 d_0$ | $d_1 \mathbb{H}_1^{-1} d_1^t$ |
| Hodge-Laplace | $\mathbb{H}_1 d_0 \mathbb{H}_0^{-1} d_0^t \mathbb{H}_1 + d_1^t \mathbb{H}_2 d_1$ | $\mathbb{H}_1^{-1} d_1^t \mathbb{H}_2 d_1 \mathbb{H}_1^{-1} + d_0 \mathbb{H}_0^{-1} d_0^t$ |

The above table describes operators as applied in equations for a DEC framework (under the column listed Polygonal Surface) and for the SEC framework (under the column listed Subdivision Surface). The processing application 132 may apply the operators may be applied to formulas used to calculate subdivision surfaces for various operators, such as parameterization, geodesic distances, vector field design, and the like.

Figure 3:
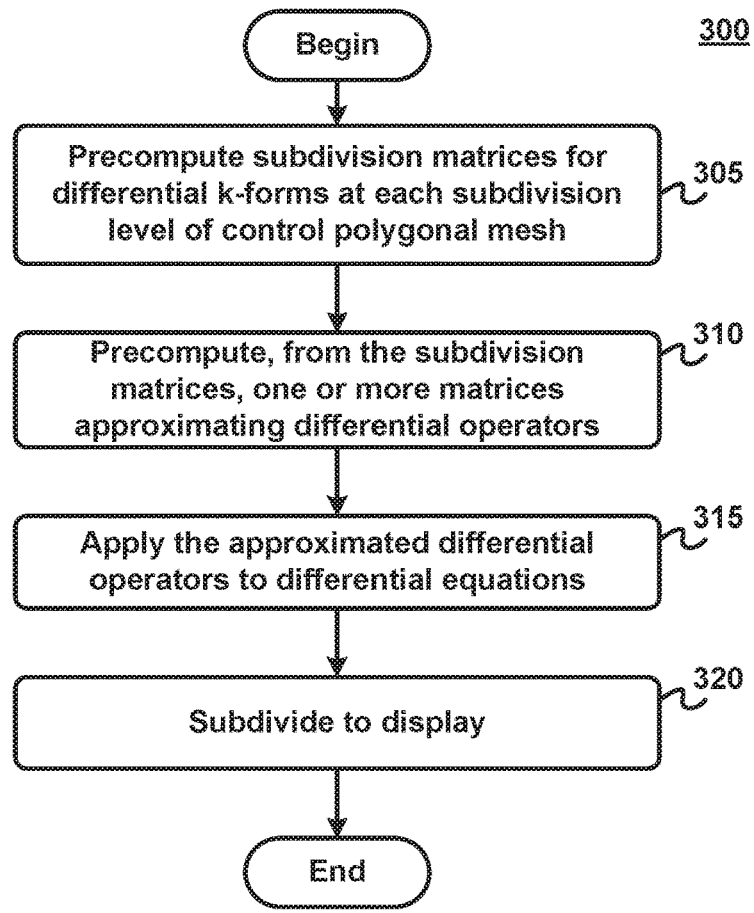
FIG. 3 illustrates an example method of processing a geometric task on subdivision surfaces, according to one embodiment.

FIG. 3 illustrates a method 300 for processing a geometric task on subdivision surfaces, according to one embodiment. The processing application 132 may receive a given graphical processing task to perform that requires differential equations to be numerically solved. The processing application 132 receives a control polygonal mesh for use in performing the graphical processing task, such as the graphics data 142. For example, the processing application 132 may receive instructions from a gaming application that includes the control polygonal mesh to create a subdivision surface model of the control polygonal mesh. The processing application 132 may determine the vertices, edges, and faces of the control polygonal mesh.

At step 305, the processing application 132 determines subdivision matrices for differential k-forms at each subdivision level l of the control mesh based on the identified vertices, edges, and faces of the original control mesh. That is, the processing application 132 precomputes $\{S_k^l \ldots S_k^0\}$. As stated, the subdivision matrices are used to define discrete forms on the control polygonal mesh. Further, the discrete forms automatically define smooth forms on a limit surface of the control mesh.

At step 310, the processing application 132 determines one or more matrices from the subdivision matrices that approximate differential operators. More particularly, the processing application 132 precomputes $\{d_k^0, \mathbb{H}_k^0\}$. The exterior derivatives $d_k^0$, commute with subdivision (equation 2), and thus structurally, operators such as the curl operator commutes with subdivision. The processing application 132 also uses discrete Hodge stars to refine the control mesh up through subdivision level l. The processing application 132 recursively solves the differential equations on the control polygonal mesh using the determined subdivision matrices, exterior derivatives, and discrete Hodge stars at each level l for a particular operation. In practice, the processing application 132 solves for l=3 to reduce operator error. However, accuracy at coarser levels can be improved by snapping refined coefficients to respective limit values.

At step 315, the processing application 132 applies the approximated differential operators to numerically solve the differential equations. And at step 320, the processing application 132 subdivides the solution to display. At each iteration of the subdivision levels, the processing application 132 further smoothens the control mesh by subdividing the numerical solutions using the subdivision matrices. Because the calculations are performed on the original control polygonal mesh, no new degrees of freedom are added. The processing application 132 may then return the resulting control mesh to the requesting application, where the application presents the resulting control mesh.

Figure 4:
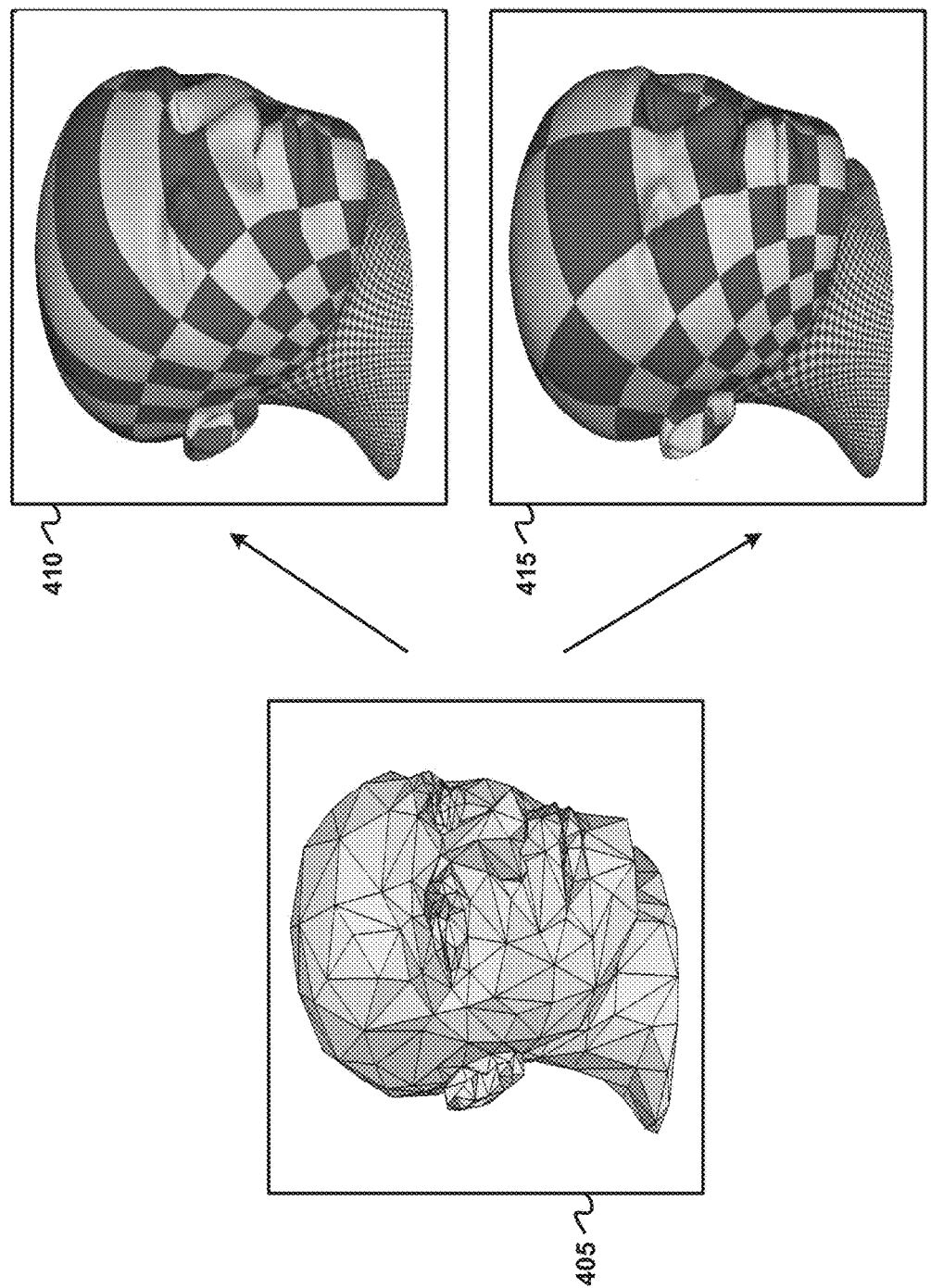
FIG. 4 illustrates example parameterizations of a polygonal control mesh where the parameterizations are generated under the SEC framework and under DEC methods, according to one embodiment.

FIG. 4 illustrates example parameterizations 410 and 415 of a control mesh 405, according to one embodiment. As stated, geometry processing operations formulated using DEC may be applied to subdivision surfaces using the SEC framework. Surface parameterization is one type of geometry processing operation that typically uses DEC operators but is improved upon with regards to accuracy and computation time using the SEC framework. The parameterization 410 is generated using conventional DEC operators and the parameterization 415 is generated using the SEC framework (where SEC operators are used in place of the DEC operators).

In particular, FIG. 4 depicts a result of a Mullen spectral conformal technique for surface parameterization on the control mesh 405 of a mannequin head, where subdivision level l32 3. In this example for parameterization 415, discrete Hodge stars $H_0$ and $H_1$ are set to mass matrices $M_0$ and $M_1$, respectively. Further, discrete Hodge star $H_2$ is set to a diagonal matrix with the inverse area of the maximal projection of each polygon in parameterization 415. The parameterization technique uses a constrained minimization of quadratic conformal energy:

$$E_C(u) = E_D(u) - \tfrac{1}{2} u^t B u \quad (9)$$

where u is a vector of (u, v) coordinates of vertices of the control mesh 405, $E_D$ is a Dirichlet energy that invokes the Laplace-Beltrami operator of the surface, and B is the quadratic form representing the area of parameterization.

Texture distortion and quasi-conformal error plots may indicate that the parameterization 415 presents the subdivision surfaces with improved accuracy over the parameterization 410. For example, the parameterization 410 results in a relatively large quasi-conformal distortion with a mean value of 1.784 and a max value of 9.4 after subdivision. By contrast, the parameterization 515 results in a reduced distortion of a mean value of 1.005 and a max value of 3.0 after subdivision. Further, because the sparsity of the Hodge star matrices only change from a one-ring neighborhood in DEC to a two-ring neighborhood in SEC, Eigen computations are merely slightly affected.

Figure 5:
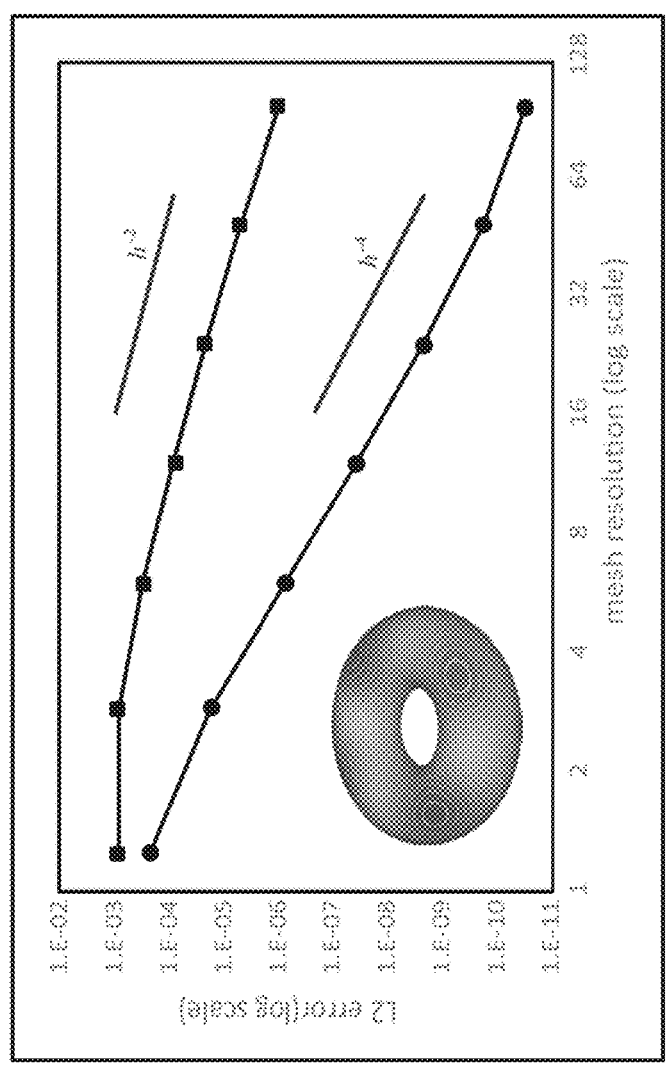
FIG. 5 illustrates an example graph comparing convergence rates between a DEC-based and SEC-based generation of subdivision surfaces for a given shape, according to one embodiment.

FIG. 5 illustrates a graph comparing convergence rates between a DEC-based and SEC-based generation of subdivision surfaces for a given shape, according to one embodiment. In this particular example, the graph represents the convergence rates for a torus generated under the SEC framework and under conventional DEC methods. Further, the graph depicted in FIG. 5 is a log-log plot of an $L^2$ error of a Poisson solve versus the inverse of the mean edge length h. The square-dotted line represents the convergence rate under the DEC approach, and the circle-dotted line represents the convergence rate under the SEC approach (i.e., where SEC operators such as those listed in Table 1 replace DEC operators in the Poisson solution).

By analyzing the convergence rate, projection errors between the SEC framework and the DEC approach can be analyzed relative to one another. A finite element solution on a high resolution mesh is used as ground truth, and error norms are evaluated at l=7 for fairness. As shown, the rate of convergence under DEC is roughly $\mathcal{O}(h^{-2})$, where h indicates a mean edge length. By contrast, the convergence under the SEC framework exhibits a projection error decreasing by $\mathcal{O}(h^{-4})$ on regular meshes. Further, the order of convergence for meshes with high curvature regions is reduced.

In the preceding description, reference is made to embodiments of the present disclosure. However the present disclosure is not limited to specific described embodiments. Instead, any combination of the preceding features and elements, whether related to different embodiments or not, is contemplated to implement and practice the present disclosure. Furthermore, although embodiments presented herein may achieve advantages over other possible solutions and/or over the prior art, whether or not a particular advantage is achieved by a given embodiment is not limiting. Thus, the preceding aspects, features, embodiments and advantages are merely illustrative and are not considered elements or limitations of the appended claims except where explicitly recited in a claim(s).

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "system."

Furthermore, aspects of the present disclosure may take the form of a computer program product embodied in one or more computer readable medium(s) having computer readable program code embodied thereon. Any combination of one or more tangible computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments may be devised without departing from the basic scope thereof, and the scope thereof is determined by the claims that follow.

What is claimed is:

1. A computer-implemented method for processing a subdivision surface of an input geometry, the method comprising:
   receiving, via one or more processors, a control polygonal mesh associated with one or more subdivision levels;
   generating, via the one or more processors, a subdivision surface model from the control polygonal mesh based on one or more differential equations by:
      determining, at each subdivision level of the control polygonal mesh, one or more subdivision matrices of a respective k-form of each respective subdivision level,
      computing, from the subdivision matrices determined from each k-form, one or more matrices approximating differential operators,
      solving the one or more differential equations with the approximated differential operators computed from the subdivision matrices, and
      subdividing the control polygonal mesh using a solution of the solved one or more differential equations; and
   rendering, via the one or more processors, a subdivided control polygonal mesh with the subdivision surface model.

2. The method of claim 1, wherein the differential equations are specified according to a geometric processing task.

3. The method of claim 2, further comprising:
applying the one or more differential operators as parameters to the geometric processing task.

4. The method of claim 2, wherein the geometric processing task is one of at least a parameterization operation, a geodesic distance calculation operation, and a vector field design operation.

5. The method of claim 1, wherein the subdivision is performed on an original version of the control polygonal mesh.

6. The method of claim 1, wherein the subdivision matrices define refinable discrete forms on different levels of the control polygonal mesh.

7. A non-transitory computer-readable storage medium storing instructions, which, when executed on a processor, performs an operation for processing a subdivision surface of an input geometry, the operation comprising:
receiving, via one or more processors, a control polygonal mesh associated with one or more subdivision levels;
generating, via the one or more processors, a subdivision surface model from the control polygonal mesh based on one or more differential equations by:
determining, at each subdivision level of the control polygonal mesh, one or more subdivision matrices of a respective k-form of each respective subdivision level,
computing, from the subdivision matrices determined from each k-form, one or more matrices approximating differential operators,
solving the one or more differential equations with the approximated differential operators computed from the subdivision matrices, and
subdividing the control polygonal mesh using a solution of the solved one or more differential equations; and
rendering, via the one or more processors, a subdivided control polygonal mesh with the subdivision surface model.

8. The computer-readable storage medium of claim 7, wherein the differential equations are specified according to a geometric processing task.

9. The computer-readable storage medium of claim 8, wherein the operation further comprises:
applying the one or more differential operators as parameters to the geometric processing task.

10. The computer-readable storage medium of claim 7, wherein the geometric processing task is one of at least a parameterization operation, a geodesic distance calculation operation, and a vector field design operation.

11. The computer-readable storage medium of claim 7, wherein the subdivision is performed on an original version of the control polygonal mesh.

12. The computer-readable storage medium of claim 7, wherein the subdivision matrices define refinable discrete forms on different levels of the control polygonal mesh.

13. A system, comprising:
a processor; and
a memory storing program code, which, when executed on the processor, performs an operation for processing a subdivision surface of an input geometry, the operation comprising:
receiving, via the processor, a control polygonal mesh associated with one or more subdivision levels,
generating, via the processor, a subdivision surface model from the control polygonal mesh based on one or more differential equations by:
determining, at each subdivision level of the control polygonal mesh, one or more subdivision matrices of a respective k-form of each respective subdivision level,
computing, from the subdivision matrices determined from each k-form, one or more matrices approximating differential operators,
solving the one or more differential equations with the approximated differential operators computed from the subdivision matrices, and
subdividing the control polygonal mesh using a solution of the solved one or more differential equations; and
rendering, via the processor, a subdivided control polygonal mesh with the subdivision surface model.

14. The system of claim 13, wherein the differential equations are specified according to a geometric processing task.

15. The system of claim 14, wherein the operation further comprises:
applying the one or more differential operators as parameters to the geometric processing task.

16. The system of claim 13, wherein the subdivision is performed on an original version of the control polygonal mesh.

17. The system of claim 13, wherein the subdivision matrices define refinable discrete forms on different levels of the control polygonal mesh.

* * * * *

UNITED STATES PATENT AND TRADEMARK OFFICE
CERTIFICATE OF CORRECTION

PATENT NO. : 10,002,461 B2
APPLICATION NO. : 15/409005
DATED : June 19, 2018
INVENTOR(S) : Fernando Ferrari De Goes Page 1 of 1

It is certified that error appears in the above-identified patent and that said Letters Patent is hereby corrected as shown below:

On the Title Page

In Column 1, under "(*) Notice", Line 3, after "0 days." delete "days.".

On the page 2, in Column 2, under "Other Publications", Line 19, delete "Nguyen T." and insert -- Nguyen, T., --, therefor.

In the Specification

In Column 7, Line 20, delete "$\overset{\text{def}}{=} \mathbb{H}_k^{0\cdot}$" and insert -- $\mathbb{H}_k^{0\cdot}$ --, therefor.

In Column 7, Line 22, delete "$\mathbb{H}_k^0 \mathbb{H}(A_k^l)^t H_k^l(A_k^l)$" and insert -- $\mathbb{H}_k^0 \overset{\text{def}}{=} (A_k^l)^t H_k^l(A_k^l)$ --, therefor.

In Column 8, Line 57, delete "132 3." and insert -- I=3. --, therefor.

Signed and Sealed this
Twenty-eighth Day of May, 2019

Andrei Iancu
*Director of the United States Patent and Trademark Office*